(12) United States Patent
Ganesan et al.

(10) Patent No.: US 11,550,593 B2
(45) Date of Patent: Jan. 10, 2023

(54) INFORMATION HANDLING SYSTEM QUICK BOOT

(71) Applicant: Dell Products L.P., Round Rock, TX (US)

(72) Inventors: Vaideeswaran Ganesan, Bangalore (IN); Suren Kumar, Vellore (IN); B. Balaji Singh, Bangalore (IN); David Keith Chalfant, Round Rock, TX (US); Swamy Kadaba Chaluvaiah, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 361 days.

(21) Appl. No.: 16/243,039

(22) Filed: Jan. 8, 2019

(65) Prior Publication Data

US 2020/0218544 A1 Jul. 9, 2020

(51) Int. Cl.
*G06F 9/00* (2006.01)
*G06F 9/4401* (2018.01)
*G06F 13/42* (2006.01)

(52) U.S. Cl.
CPC ........ *G06F 9/4406* (2013.01); *G06F 13/4221* (2013.01); *G06F 9/4401* (2013.01); *G06F 2213/0024* (2013.01)

(58) Field of Classification Search
None
See application file for complete search history.

(56) References Cited

U.S. PATENT DOCUMENTS

| | | | | |
|---|---|---|---|---|
| 6,035,423 A | * | 3/2000 | Hodges | G06F 8/65 709/219 |
| 6,434,696 B1 | | 8/2002 | Kang | |
| 6,543,047 B1 | * | 4/2003 | Vrhel, Jr. | G06F 8/61 717/121 |
| 6,718,461 B1 | | 4/2004 | Ewertz | |
| 6,883,091 B2 | | 4/2005 | Morrison et al. | |
| 7,219,219 B1 | * | 5/2007 | Wisor | G06F 9/4411 713/1 |
| 7,318,151 B1 | * | 1/2008 | Harris | G06F 21/572 713/100 |
| 7,409,537 B2 | | 8/2008 | Tsang | |
| 7,568,195 B2 | | 7/2009 | Markley et al. | |
| 7,584,467 B2 | | 9/2009 | Wickham et al. | |
| 8,412,816 B2 | | 4/2013 | Jreij et al. | |
| 8,578,366 B2 | * | 11/2013 | Ricci | G06Q 10/06 717/173 |
| 9,405,526 B2 | | 8/2016 | Thapar et al. | |
| 9,747,096 B2 | * | 8/2017 | Searle | H04L 67/10 |

(Continued)

*Primary Examiner* — Volvick Derose
(74) *Attorney, Agent, or Firm* — Norton Rose Fulbright US LLP

(57) ABSTRACT

An information handling system may perform a quick boot based on a determination that a boot does not require an update to at least one of a firmware and hardware of an information handling system. The information handling system may reboot and may determine whether a boot of the system requires an update to at least one of a firmware and hardware of the information handling system. If the boot does not require an update to the at least one of a firmware and hardware of the information handling system, the information handling system may boot by bypassing one or more basic input/output system (BIOS) power-on self-test (POST) operations.

17 Claims, 6 Drawing Sheets

(56) References Cited

U.S. PATENT DOCUMENTS

| | | | |
|---|---|---|---|
| 9,971,871 B2* | 5/2018 | Arrizza | G16H 70/40 |
| 10,127,032 B2* | 11/2018 | Su | G06F 8/66 |
| 10,331,428 B1* | 6/2019 | Zalpuri | G06F 8/654 |
| 10,678,529 B1* | 6/2020 | Farhan | H04L 67/34 |
| 11,216,552 B2* | 1/2022 | Liu | G06F 21/79 |
| 2005/0097543 A1* | 5/2005 | Hirayama | G06F 8/65 |
| | | | 717/168 |
| 2005/0223209 A1 | 10/2005 | Chang | |
| 2006/0031664 A1* | 2/2006 | Wilson | G06F 8/65 |
| | | | 713/1 |
| 2007/0028080 A1* | 2/2007 | Hobson | G06F 9/4418 |
| | | | 713/1 |
| 2009/0006834 A1* | 1/2009 | Rothman | G06F 8/65 |
| | | | 713/2 |
| 2009/0132799 A1* | 5/2009 | Brumley | G06F 9/44505 |
| | | | 713/100 |
| 2009/0217257 A1* | 8/2009 | Huang | G06F 8/65 |
| | | | 717/168 |
| 2009/0300342 A1* | 12/2009 | Garcia | G06F 1/24 |
| | | | 713/1 |
| 2009/0307677 A1* | 12/2009 | Long | G06F 8/654 |
| | | | 717/168 |
| 2010/0332813 A1* | 12/2010 | Rothman | G06F 9/4401 |
| | | | 713/2 |
| 2011/0093839 A1* | 4/2011 | Murase | G06F 8/658 |
| | | | 717/168 |
| 2011/0154484 A1* | 6/2011 | Shimabe | G06F 21/575 |
| | | | 726/19 |
| 2012/0239918 A1* | 9/2012 | Huang | G06F 9/4401 |
| | | | 713/2 |
| 2013/0138940 A1* | 5/2013 | Wang | G06F 8/654 |
| | | | 713/2 |
| 2013/0262848 A1* | 10/2013 | Chan | G06F 8/65 |
| | | | 713/2 |
| 2013/0311761 A1* | 11/2013 | Dasari | G06F 9/24 |
| | | | 713/1 |
| 2014/0068585 A1* | 3/2014 | Young | G06F 21/572 |
| | | | 717/168 |
| 2014/0201514 A1* | 7/2014 | Chao | G06F 9/4418 |
| | | | 713/2 |
| 2014/0282480 A1* | 9/2014 | Matthew | G06F 8/60 |
| | | | 717/172 |
| 2016/0055068 A1* | 2/2016 | Jeansonne | G06F 21/572 |
| | | | 714/15 |
| 2016/0117634 A1* | 4/2016 | Kunnathur Ragupathi | |
| | | | G06Q 10/087 |
| | | | 705/28 |
| 2016/0350100 A1* | 12/2016 | Folske | G06F 8/654 |
| 2017/0046229 A1* | 2/2017 | Hsu | G06F 11/1417 |
| 2017/0249135 A1* | 8/2017 | Gandhi | G06F 8/654 |
| 2018/0165101 A1 | 6/2018 | Bulusu et al. | |
| 2019/0250900 A1* | 8/2019 | Troia | H04L 67/12 |
| 2020/0218527 A1* | 7/2020 | Ganesan | G06F 13/1668 |
| 2020/0218544 A1* | 7/2020 | Ganesan | G06F 9/4406 |
| 2020/0218545 A1* | 7/2020 | Ganesan | G06F 11/1433 |

* cited by examiner

INFORMATION HANDLING SYSTEM QUICK BOOT

FIELD OF THE DISCLOSURE

The instant disclosure relates to startup of an information handling system. More specifically, portions of this disclosure relate to quick booting of an information handling system.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be rebooted by users for a variety of reasons. For example, a user may power down an information handling system to save energy when the system is not in use. Alternatively or additionally, a user may reboot an information handling system in order to install hardware, firmware, and/or software updates.

When an information handling system is powered on, the system may go through a booting process to initialize hardware and software for use. For example, during a booting process information handling systems may load and initialize drivers, inventory hardware components, apply hardware, firmware, and software updates, and load and boot an operating system (OS) of the information handling system. Booting and/or rebooting an information handling system may require a substantial amount of time, sometimes reaching and even exceeding 10 minutes, which can negatively impact a user experience. Furthermore, extended booting times may cause users to delay rebooting to install system updates, which may increase the risk of system failures or security breaches.

Shortcomings mentioned here are only representative and are included simply to highlight that a need exists for improved information handling systems, particularly for quick booting. Embodiments described herein address certain shortcomings but not necessarily each and every one described here or known in the art. Furthermore, embodiments described herein may present other benefits than, and be used in other applications than, those of the shortcomings described above.

SUMMARY

When an information handling system is rebooted without requiring installation of an update to firmware or hardware, a variety of booting processes may be unnecessary as firmware and hardware initialization characteristics may remain unchanged from a prior boot cycle. An information handling system may reduce boot time by performing a quick boot when a reboot is determined to not require a firmware or hardware update. For example, when a firmware or hardware update is not required, an information handling system may bypass a variety of basic input/output system (BIOS) power-on self-test (POST) operations to substantially reduce booting time. In some instances, such bypassing may reduce boot time to below one minute.

An information handling system may perform a quick boot upon determining that a reboot does not require an update to hardware or firmware of the information handling system. A method for rebooting an information handling system may begin with rebooting an information handling system. For example, the information handling system may shut down and start up following a user instruction to reboot the information handling system. In some embodiments, the information handling system may shut down following a use instruction to shut down and may subsequently start up following a user instruction to start up. Alternatively or additionally, an information handling system may automatically shut down and start up when the information handling system downloads a software, hardware, or firmware update. In some cases, rebooting the information handling system may include performing a soft reboot of the information handling system.

The information handling system may determine whether the boot requires an update to at least one of a firmware and hardware of the information handling system. Such a determination may be made prior to or following a soft reboot or a hard reboot, such as powering down and subsequent powering up of the information handling system. A determination of whether the information handling system boot requires an update to at least one of a firmware and hardware may include a determination of whether the information handling system boot requires only an update to one or more software components or no update to software, hardware, or firmware. When an update to at least one of a firmware and hardware of the information handling system is downloaded, the information handling system may toggle a boot flag stored in non-volatile random access memory (NVRAM) to indicate that a detailed boot is necessary to implement the update to the firmware and/or hardware. The boot flag may be initialized to indicate that a boot does not require and update to at least one of a firmware and hardware and that a quick boot should be performed and then updated to indicate that a detailed boot is required when firmware and/or hardware updates are downloaded and prepared for installation. To determine whether the boot requires an update to a firmware and/or hardware, the information handling system may examine the boot flag. For example, the information handling system may examine the boot flag after powering-off and subsequently powering-on near the beginning of a booting process. If the boot flag indicates that the boot requires an update to a firmware and/or hardware, the information handling system may perform a detailed boot to install the firmware and/or hardware updates, but if the boot flag indicates that the boot does not require an update to at least one of a firmware and hardware, the information handling system may perform a quick boot.

If the information handling system determines that a boot does not require an update to at least one of a firmware and hardware, the information handling system may perform a quick boot. The quick boot may include bypassing one or more BIOS POST operations while booting the information handling system. Furthermore, in performing a quick boot the information handling system may load a last known good map of boot devices from NVRAM that was stored during a prior successful boot. For example, when an information handling system performs a successful detailed boot including mapping of boot devices, the information handling system may store the map and other booting information in NVRAM for access during a quick boot operation when the information handling system is next booted.

In some embodiments, the information handling system may also determine whether a chassis of the system has been opened following a prior boot cycle. If the chassis has been opened, the information handling system may perform a detailed boot. An open chassis may indicate that additional PCIe components, such as non-hot-pluggable PCIe components have been inserted. For example, even if no hardware and/or firmware updates are detected for installation with the boot, the information handling system may perform a detailed boot if the chassis has been opened. If the chassis has not been opened, the information handling system may proceed to perform a quick boot, if no hardware or firmware updates are to be installed with the boot.

An information handling system may include a processor for performing the steps described herein. Furthermore, an information handling system may include an NVRAM for storing instructions, a boot flag, mappings of boot devices, and/or other information required or useful for performing a quick boot. Instructions for performing the steps described herein may be stored on a non-transitory computer readable medium.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
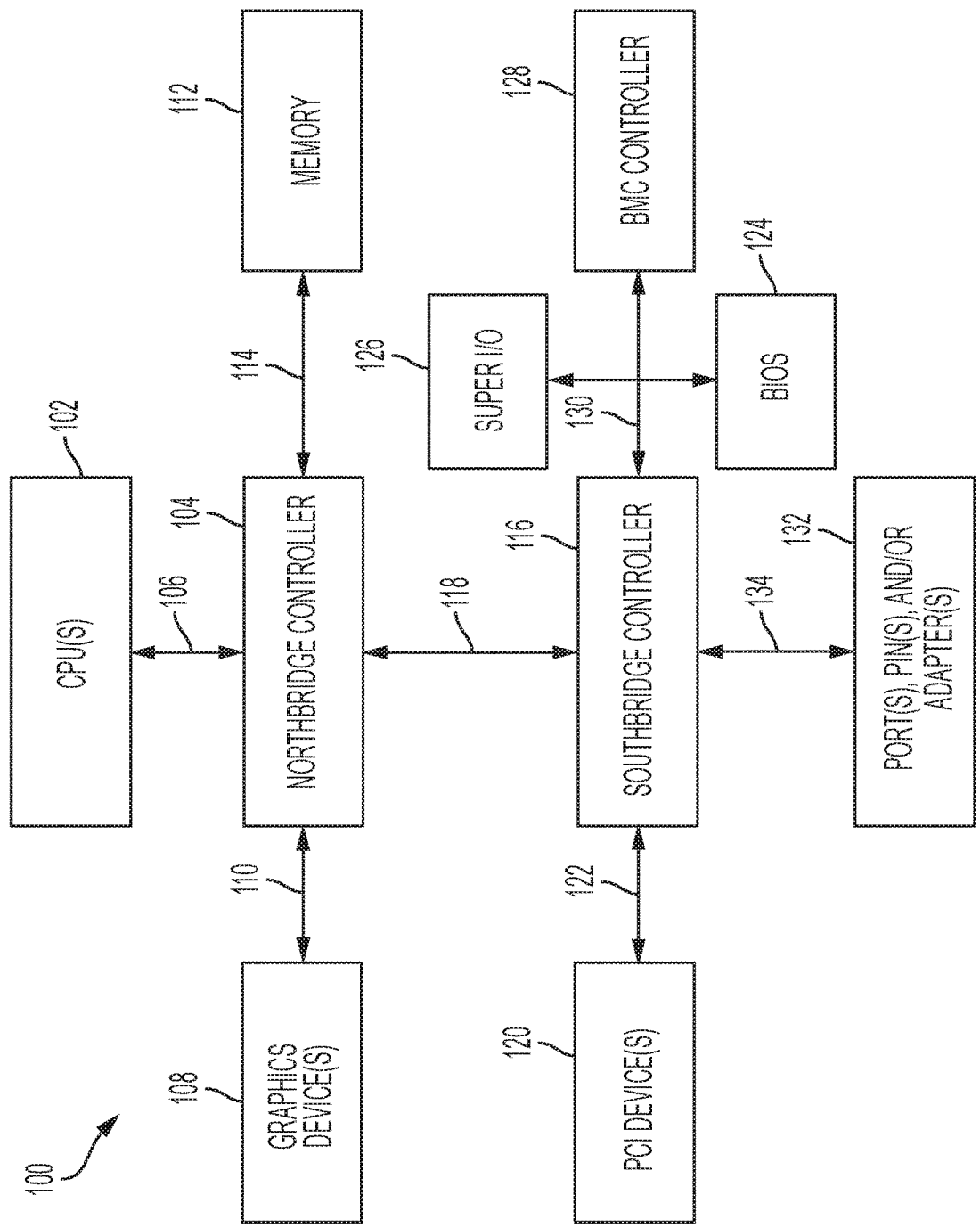
FIG. 1 is a schematic block diagram of an example information handling system according to some embodiments of the disclosure.

An information handling system may include a variety of components to generate, process, display, manipulate, transmit, and receive information. One example of an information handling system 100 is shown in FIG. 1. IHS 100 may include one or more central processing units (CPUs) 102. In some embodiments, IHS 100 may be a single-processor system with a single CPU 102, while in other embodiments IHS 100 may be a multi-processor system including two or more CPUs 102 (e.g., two, four, eight, or any other suitable number). CPU(s) 102 may include any processor capable of executing program instructions. For example, CPU(s) 102 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 102 may commonly, but not necessarily, implement the same ISA.

CPU(s) 102 may be coupled to northbridge controller or chipset 104 via front-side bus 106. The front-side bus 106 may include multiple data links arranged in a set or bus configuration. Northbridge controller 104 may be configured to coordinate I/O traffic between CPU(s) 102 and other components. For example, northbridge controller 104 may be coupled to graphics device(s) 108 (e.g., one or more video cards or adaptors, etc.) via graphics bus 110 (e.g., an Accelerated Graphics Port or AGP bus, a Peripheral Component Interconnect or PCI bus, etc.). Northbridge controller 104 may also be coupled to system memory 112 via memory bus 114. Memory 112 may be configured to store program instructions and/or data accessible by CPU(s) 102. In various embodiments, memory 112 may be implemented using any suitable memory technology, such as static RAM (SRAM), synchronous dynamic RAM (SDRAM), nonvolatile/Flash-type memory, or any other type of memory. In some embodiments memory 112 may include NVRAM. In other embodiments, NVRAM may be separately included in or coupled to CPU 102.

Northbridge controller 104 may be coupled to southbridge controller or chipset 116 via internal bus 118. Generally, southbridge controller 116 may be configured to handle various of IHS 100's I/O operations, and it may provide interfaces such as, for instance, Universal Serial Bus (USB), audio, serial, parallel, Ethernet, etc., via port(s), pin(s), and/or adapter(s) 132 over bus 134. For example, southbridge controller 116 may be configured to allow data to be exchanged between IHS 100 and other devices, such as other IHSs attached to a network. In various embodiments, southbridge controller 116 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 116 may also enable connection to one or more keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. As shown, southbridge controller 116 may be further coupled to one or more PCI devices 120 (e.g., modems, network cards, sound cards, video cards, etc.) via PCI bus 122. Southbridge controller 116 may also be coupled to Basic I/O System (BIOS) 124, Super I/O Controller 126, and Baseboard Management Controller (BMC) 128 via Low Pin Count (LPC) bus 130. Super I/O controller 126 may combine interfaces for a variety of lower bandwidth or low data rate devices. Those devices may include, for example, floppy disks, parallel ports, keyboard and mouse, temperature sensor and fan speed monitoring, etc.

BIOS 124 may include non-volatile memory, such as NVRAM, having program instructions stored thereon. The instructions stored on the BIOS may be usable CPU(s) 102 to initialize and test other hardware components and/or to load an Operating System (OS) onto IHS 100, for example during a booting of an information handling system. The NVRAM of the BIOS may store a boot flag and instructions for performing a quick boot or a detailed boot based on a status of the boot flag. In some embodiments, the NVRAM of the BIOS may also store a boot map and booting information for performing a quick boot. As such, BIOS 124 may include a firmware interface that allows CPU(s) 102 to load and execute certain firmware. In some cases, such firmware may include program code that is compatible with the Unified Extensible Firmware Interface (UEFI) specification, although other types of firmware may be used.

BMC controller 128 may include non-volatile memory having program instructions stored thereon that are usable by CPU(s) 102 to enable remote management of IHS 100. For example, BMC controller 128 may enable a user to discover, configure, and manage BMC controller 128, setup configuration options, resolve and administer hardware or software problems, etc. Additionally or alternatively, BMC controller 128 may include one or more firmware volumes, each volume having one or more firmware files used by the BIOS' firmware interface to initialize and test components of IHS 100.

In some cases, IHS 100 may be configured to access different types of computer-accessible media separate from memory 112. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to IHS 100 via northbridge controller 104 and/or southbridge controller 116.

In some implementations, northbridge controller 104 may be combined with southbridge controller 116, and/or be at least partially incorporated into CPU(s) 102. In other implementations, one or more of the devices or components shown in FIG. 1 may be absent, or one or more other components may be added. Accordingly, systems and methods described herein may be implemented or executed with other computer system configurations. In some cases, various elements shown in FIG. 1 may be mounted on a motherboard and protected by a chassis or the like.

Figure 2:
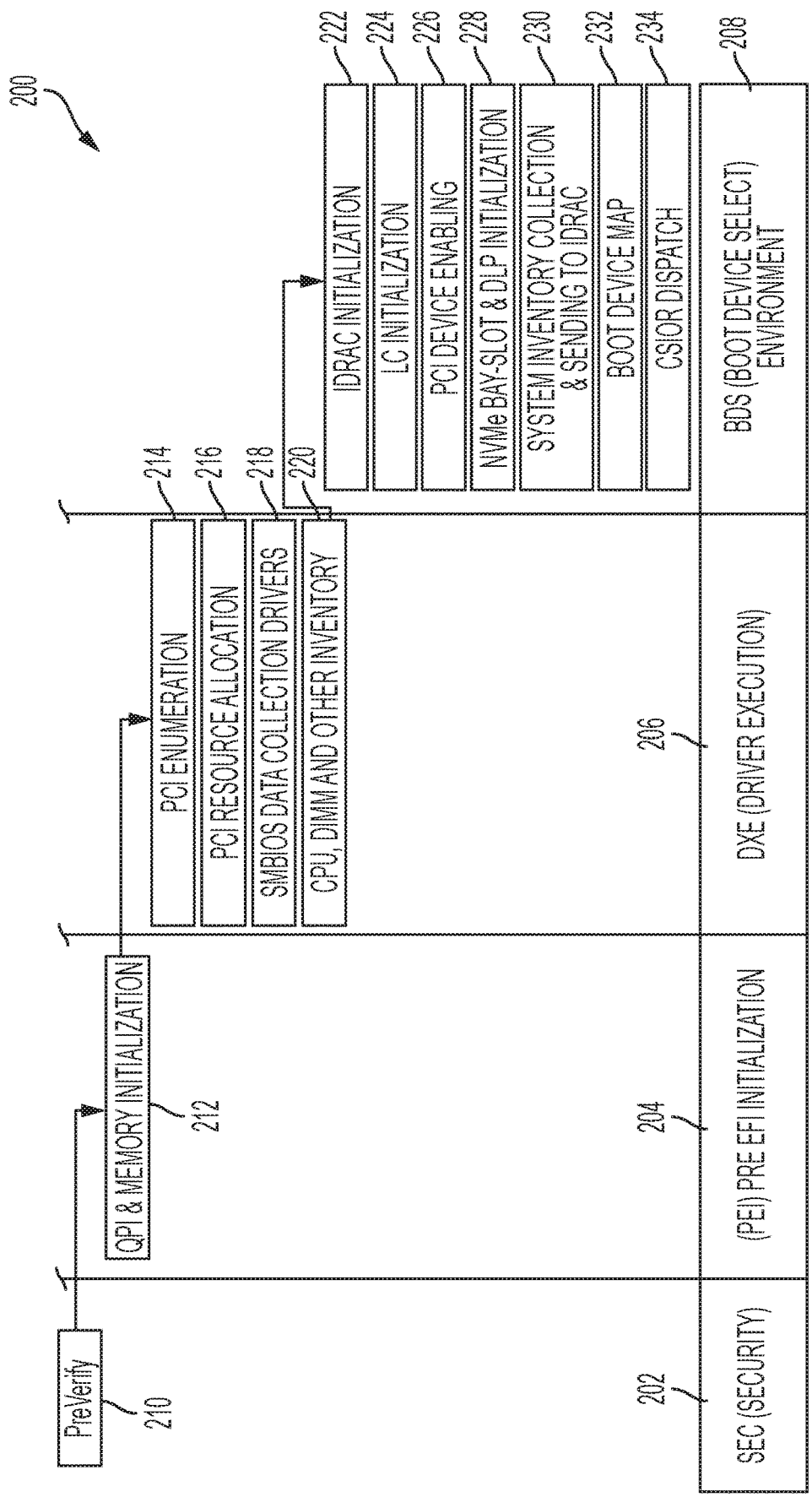
FIG. 2 is a process diagram of example information handling system detailed boot operation according to some embodiments of the disclosure.

When an information handling system is powered up, for example during a rebooting process, the information handling system may begin a booting process where a BIOS/UEFI may initialize and configure hardware and firmware, prepare the information handling system for booting of the operating system, and boot the operating system. An example process diagram 200 of a detailed booting process for an information handling system is shown in FIG. 2. The detailed booting process may allow for a full inventory of hardware and firmware, including installation of hardware and firmware updates that may have been downloaded following a prior booting process. After an IHS is powered on, the IHS may enter a security phase 202 where the BIOS/UEFI may perform a pre-verify operation 210 to examine the security certificate and verify that the device is ready for secure operation.

After the security phase 202, the IHS may enter a pre-extensible firmware interface initialization phase 204, wherein the IHS may perform Quick Path Interconnect (QPI) and memory initialization 212. During the Quick Path Interconnect and memory initialization 212, among other tasks the information handling system may check a boot flag to determine whether to perform a quick boot, as discussed with respect to FIG. 3, or detailed boot, as discussed with respect to FIG. 2, based on whether a reboot requires installation of a hardware or firmware update. Alternatively, the information handing system may check the boot flag after performing a Quick Path Interconnect and memory initialization 212. After the Quick Path Interconnect and memory are initialized, the IHS may enter a driver execution phase 206.

During the driver execution phase 206, the information handling system may perform Peripheral Component Interconnect (PCI) enumeration 214 to detect, configure, and/or initialize any devices connected to and/or integrated in the information handling system. After performing PCI enumeration 214, the IHS may perform PCI resource allocation 216 to allocate resources, such as memory, to the detected devices. The IHS may then execute 218 system management basic input/output system (SMBIOS) data collection drivers before inventorying 220 the CPU, dual in-line memory modules (DIMMs), and/or other system elements. After the IHS has completed the driver execution phase 206, the IHS may proceed to a boot device select (BDS) environment phase 208 for selection of a boot device.

The IHS may perform integrated remote access controller initialization 222, such as initialization of a BMC. One example of a BMC may include an integrated Dell Remote Access Controller (iDRAC). The IHS may then perform line card (LC) initialization 224 and may enable PCI devices 226. The IHS may then perform non-volatile memory express (NVMe) bay-slot and data loss prevention (DLP) initialization 228. The IHS may then collect system inventory and send the system inventory to the integrated remote access controller 230. The IHS may map the boot device 232 and may perform a dispatch 234 of collected system inventory on restart (CSIOR). The information handling system may boot the operating system from the mapped boot device.

In order to facilitate a quick boot, the information handling system may save information from the detailed booting process in NVRAM. For example, the information handling system may save PCI resource allocation 216 information, SMBIOS data collection driver 218 information, CPU and DIMM and other system component inventory 220 information, PCI device enablement 226 information, a boot device map 232, and/or other information gathered during the booting process in a NVRAM of the information handling system. The information handling system may then access saved boot information during a quick boot to bypass one or more steps corresponding to portions of the saved and reusable boot data that are performed during a detailed boot.

Figure 3:
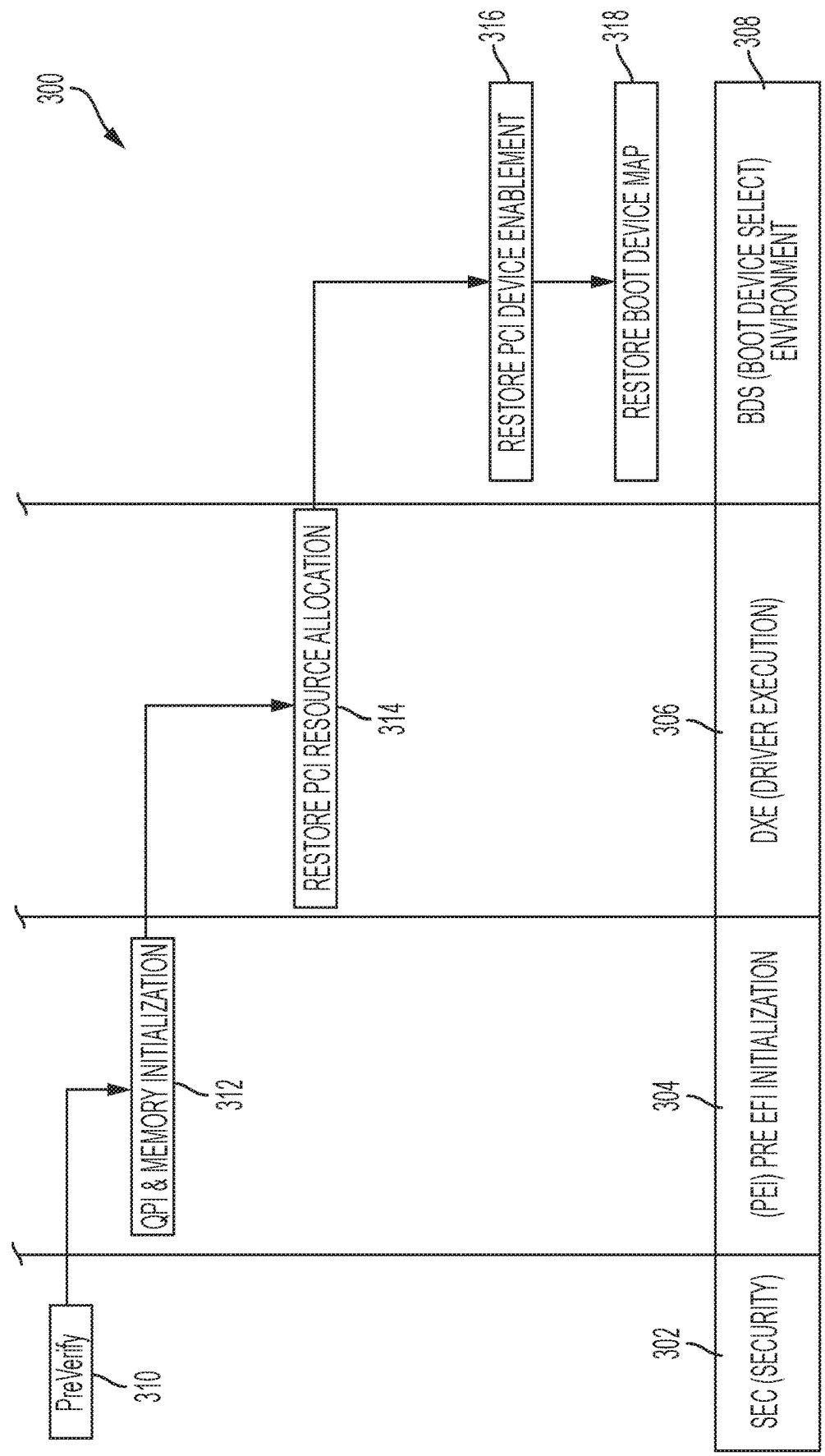
FIG. 3 is an illustration of an example information handling system quick boot operation according to some embodiments of the disclosure.

As one example, when an information handling system is booted without installation of any firmware or hardware updates, the information handling system may perform a quick boot to reduce booting time and enhance a user experience. For example, when an information handling system is rebooted for installation of a software update, without any firmware or hardware updates, the information handling system may engage in a quick boot when restarting the system. Alternatively or additionally, an information handling system may engage in a quick boot when the system is shut down by a user, without any hardware or firmware updates set for installation, and powered up by the user at a later time. An example quick boot process 300 is shown in FIG. 3. When an information handling system is powered on, it may initialize a booting process by entering a security phase 302. In the security phase 302, the information handling system may perform a pre-verify operation 310 to examine the security certificate and verify that the information handling system is ready for secure operation. The information handling system may then enter a pre-extensible firmware interface initialization phase 304 where it may perform QPI and memory initialization 312. During or following the QPI and memory initialization 312, the information handling system may determine whether to perform a quick boot or a detailed boot. For example, the information handling system may check a boot flag stored in NVRAM to determine whether installation of hardware or firmware updates is required.

If installation of hardware or firmware updates is not required, the information handling system may bypass a variety of steps performed in a quick booting process such as BIOS POST operations and/or mapping of a boot device. An advanced configuration and power interface (ACPI) driver may include functionality to restart the kernel during a quick boot, while bypassing a variety of BIOS POST operations. The ACPI driver may be configured to interact with the NVRAM boot flag to determine if a hardware or software update is required. An ACPI register reset may also be initiated when installation of a software update includes modification of a device configuration or one or more drivers. For example, after QPI and memory initialization 312 is performed, the information handling system may enter a driver execution (DXE) phase 306. During the driver execution phase, instead of performing PCI enumeration, allocating PCI resources, executing SMBIOS data collection drivers, and inventorying CPUs DIMMs and other system components, as would be performed in a detailed boot, the information handling system may restore 314 a PCI resource allocation from an NVRAM storage location. For example, the information handling system may restore 314 a PCI resource allocation that was stored in NVRAM during a prior boot, such as the example detailed boot of FIG. 2. The information handling system may also restore SMBIOS data collection driver information and inventory information for CPUs, DIMMs, and other system components. The information handling system may then enter a boot device select (BDS) phase 308. During the boot device select phase 308, instead of performing BMC initialization, such as iDRAC initialization, LC initialization, NVMe bay slot and DLP initialization, system inventory collection and transmittal to the iDRAC, and CSIOR dispatch as performed during a detailed boot, the information handling system may restore system information from NVRAM. The information handling system may restore 316 PCI device enabling information and may enable PCI devices based on the restored information. The information handling system may then restore 318 a boot device map stored in NVRAM and may proceed to boot an operating system of the information handling system. For example, the information handling system may restore PCI device enabling information and a boot device map that were stored in NVRAM during the prior detailed boot process. In some embodiments, the boot device map that is restored may be a last known good map of boot devices. Although certain steps are shown as omitted from the detailed boot of FIG. 2 from the quick boot of FIG. 3 other combinations of steps from FIG. 2 may be omitted in the quick boot of FIG. 3.

Figure 4:
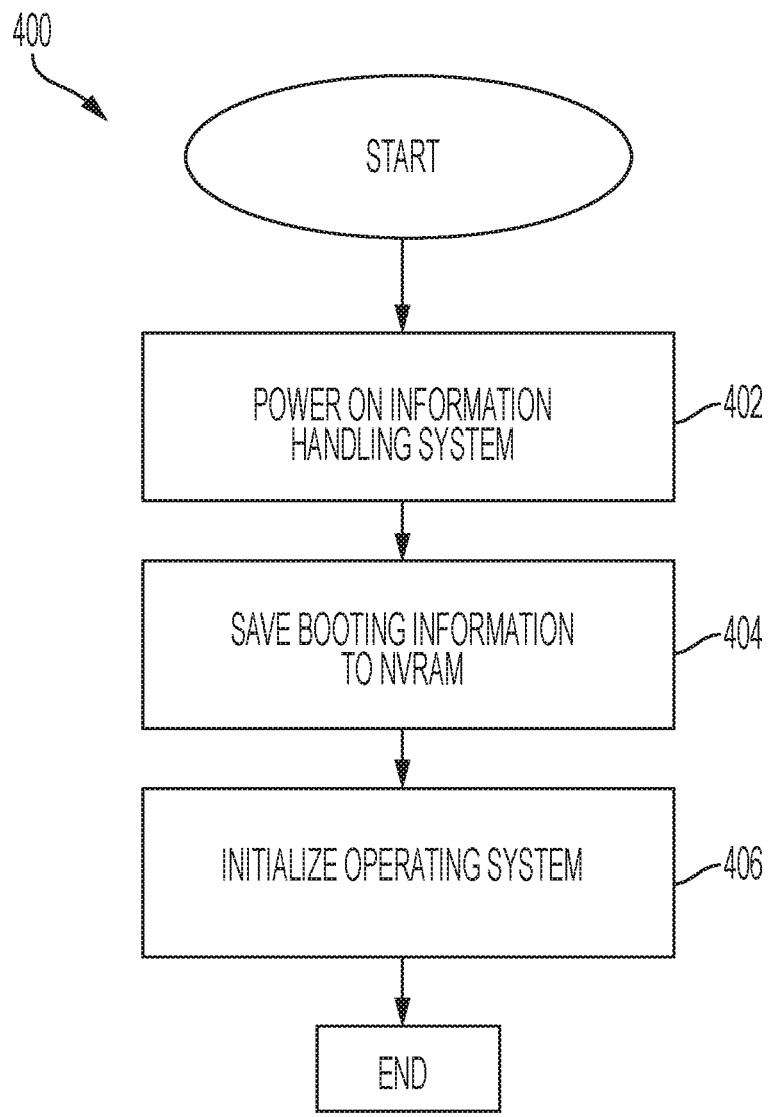
FIG. 4 is a flow chart of an example method for saving detailed boot information to NVRAM of an information handling system according to some embodiments of the disclosure.

An information handling system may store boot information in NVRAM during a detailed boot process for use in performing a quick boot process at a later time. An example method 400 for storing boot information in NVRAM is shown in FIG. 4. The method 400 may begin, at step 402, with powering on an information handling system. For example, an information handling system may restart, powering off and then powering on immediately, or may be powered on after a period of deactivation.

After the information handling system powers on, it may begin a booting process. The booting process may be a detailed booting process and may include installation of one or more firmware and/or hardware updates. During the booting process, the information handling system may, at step 404, save booting information to an NVRAM of the information handling system. For example, the information handling system may save PCI resource allocation information, SMBIOS data collection driver information, CPU, DIMM, and other system component inventories, PCI device enablement information, and a boot device map to an NVRAM of the information handling system. Once the booting process is complete, the information handling system may, at step 406, initialize an operating system of the information handling system.

Figure 5:
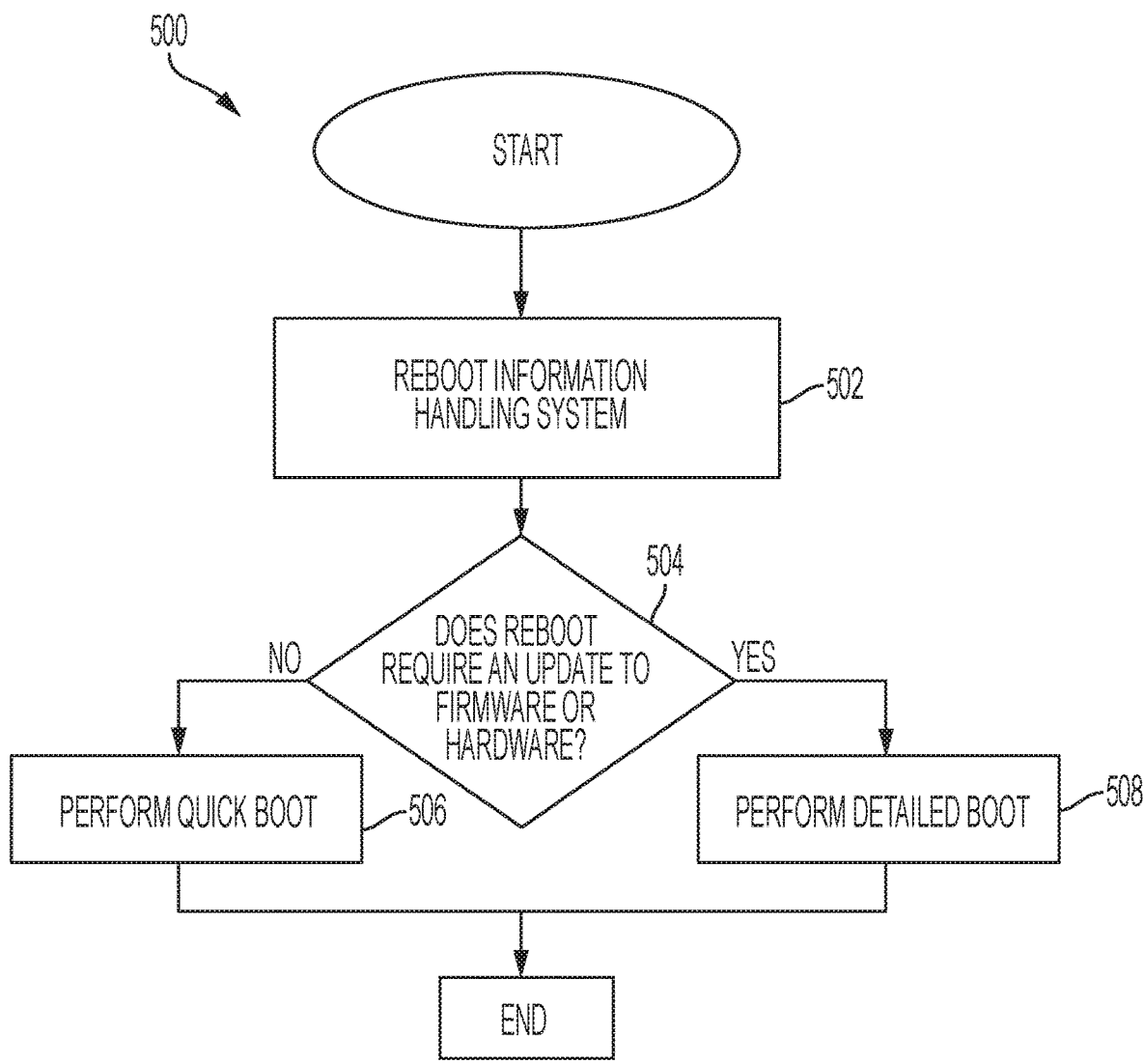
FIG. 5 is a flow chart of an example method for determining whether to perform a quick boot or detailed boot according to some embodiments of the disclosure.

An information handling system may perform a quick boot when a boot does not require installation of a hardware or firmware update. An example method 500 of rebooting an information handling system is shown in FIG. 5. The method 500, may begin, at step 502, with booting the information handling system. For example, the information handling system may be shut down or a reboot may be initiated upon detection of a reboot trigger. For example, reboot triggers may include instructions by a user to shut down or reboot or automatic instructions to reboot the information handling system, such as instructions automatically issued when an information handling system has reached a point in installation of one or more updates to hardware, firmware, or software that requires a reboot of the system to bring the updates online. Alternatively or additionally, reboot triggers may include triggers for performing a soft reboot. During a soft reboot, a kernel may call an advanced configuration and power interface (ACPI) driver reset, and may simulate a power off and subsequent power on of the system, a system POST, BIOS loading, identification of boot devices, and may load an operating system. The information handling system may reboot automatically or upon user instruction.

At step 504, the information handling system may determine whether a boot of the information handling system requires an update to at least one of a firmware and hardware. For example, the information handling system may determine whether a boot flag stored in NVRAM of the information handling system is set to indicate that firmware and hardware updates are or are not required. Such a determination may be made during a soft reboot. In some embodiments, the information handling system may determine that only an update to software, or no update at all, is required at the boot. Software updates may include updates to software applications, updates to an OS, such as patches and driver updates, system register file changes, and updates to a kernel of the information handling system. In some embodiments, the information handling system may make such a determination during a booting process following a shutdown and startup caused by a reboot trigger.

If it is determined that the boot does not require an update to at least one of a firmware and hardware, the information handling system may, at step 506, perform a quick boot. During the quick boot, the information handling system may install any software components that are slated to be installed with the boot. The quick boot may allow the information handling system to bypass certain operations in order to reduce boot time by loading boot information stored in NVRAM. For example, during the quick boot, the information handling system may bypass one or more BIOS POST operations, such as memory initialization, PCI device discovery and enumeration, and resource assignment, and may load a last known good map of boot devices and other boot information from NVRAM. The last known good map of boot devices and other boot information may be used to display a boot device menu and BIOS setup options. In some embodiments, BIOS setup options may be hidden. For example, the information handling system may perform a quick boot process as described with respect to FIG. 3. In some cases, installation of one or more software updates may require multiple reboots, and if installation of firmware and hardware updates is not required, the system may perform multiple sequential quick boots while installing the software updates. For example, changes or updates to a .NET framework and other applications may require multiple reboots. To perform a quick boot, the information handling system may include a modified advanced configuration and power interface (e.g., ACPI) driver to restart a kernel while bypassing multiple BIOS POST operations.

If it is determined that the boot requires an update to at least one of a firmware and hardware, the information handling system may, at step 508, perform a detailed boot. The detailed boot may allow the information handling system to install updates to firmware and hardware and adjust activation of firmware and hardware components accordingly. The detailed boot process may be, for example, a conventional full boot from a cold start. For example, the information handling system may perform a detailed boot process as described with respect to FIG. 2 and may save boot information to NVRAM for use in performing a future quick boot.

Figure 6:
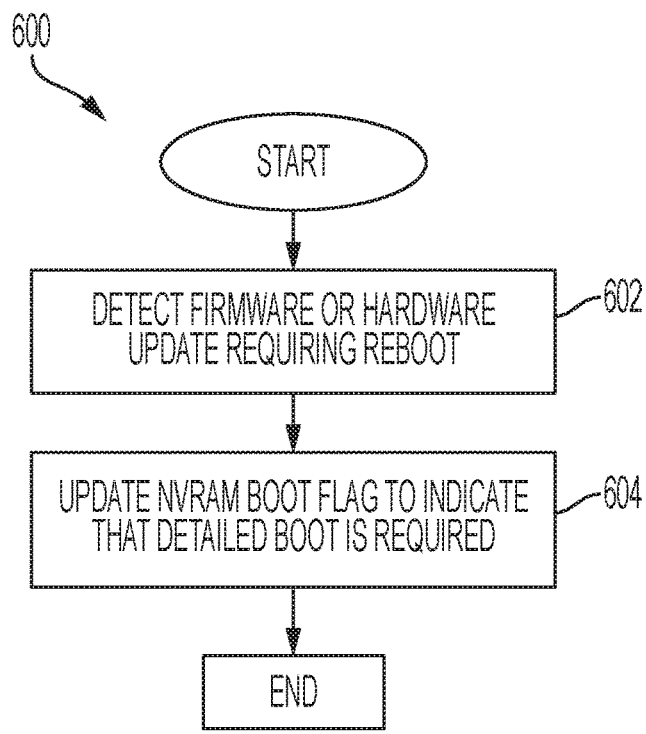
FIG. 6 is a flow chart of an example method for toggling a boot flag according to some embodiments of the disclosure.
Figure 7:
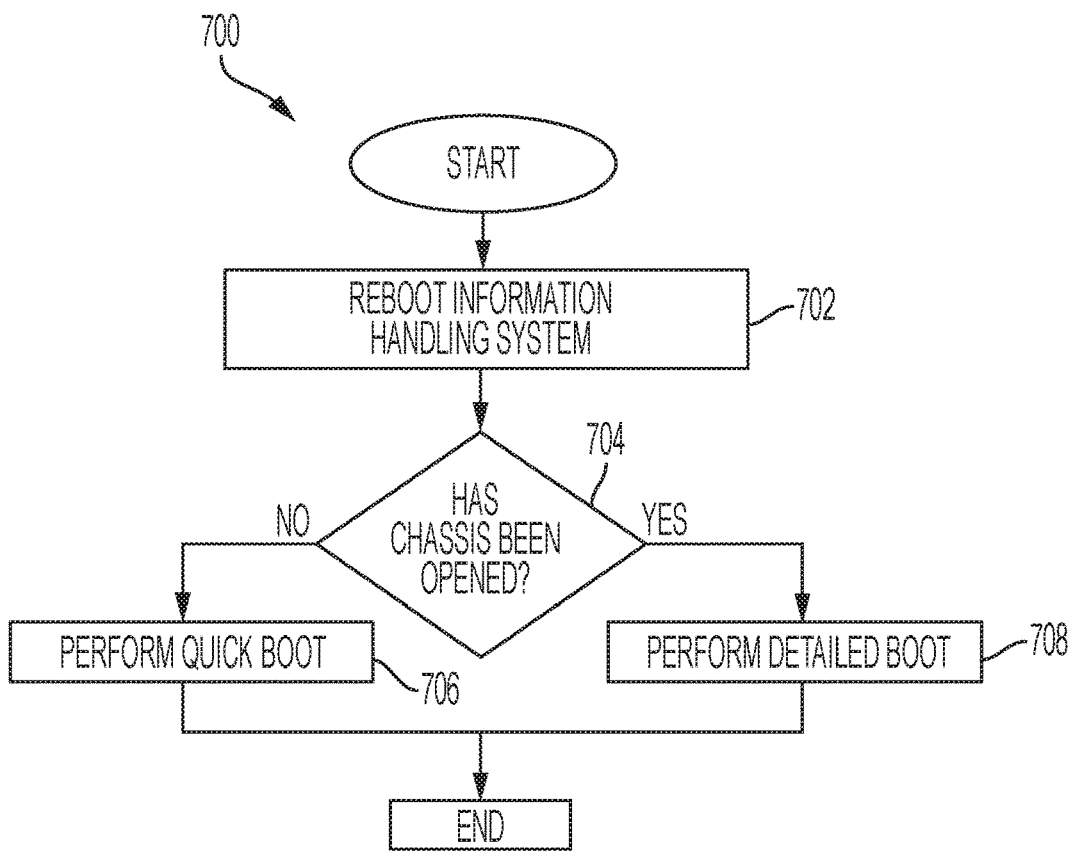
FIG. 7 is a flow chart of an example method for determining whether to perform a quick boot or detailed boot based on a chassis intrusion flag according to some embodiments of the disclosure.

An information handling system may toggle a boot flag stored in NVRAM to indicate whether a quick boot or detailed boot should be performed. A method 600 for toggling a boot flag is shown in FIG. 6. The method 600 may begin, at step 602, with detecting a firmware and/or hardware update requiring a reboot. For example, an information handling system may download an update to a firmware and/or hardware component of the system. In some embodiments, the firmware and/or hardware update may be downloaded with an indicator that a boot flag should be updated to indicate that a detailed boot is required for installation. For example, the information handling system may detect downloading of a BIOS update package, such as a Dell update package, that includes an instruction to toggle a boot flag to indicate that a detailed boot is required. At step 604, the information handling system may update a boot flag stored in NVRAM to indicate that a detailed boot is required. For example, the boot flag may be set, by default, to indicate that a detailed boot is not required and that a quick boot should be performed. When a firmware and/or hardware update is downloaded and scheduled for installation following the next reboot, the information handling system may toggle the boot flag to indicate that a detailed boot should be performed at the next reboot. After a detailed boot is performed and boot information for performing a quick reboot is stored to NVRAM, the information handling system may reset the boot flag to indicate that a quick boot should be performed at the next reboot. Thus, boot time may be reduced, improving a user experience.

When information handling systems are rebooted without insertion of additional information handling system components, following a prior boot, certain boot processes may be bypassed in order to reduce boot time. For example, a user may receive a server, such as a Dell Factory Installed Server, with an operating system installed and setup completed, may boot the server after it is received. Alternatively or additionally, users may engage servers in physical power cycles to power down and power up the server. When a system is booted without addition of hardware components following a prior boot, certain BIOS processes may be bypassed and/or optimized to reduce boot time. Users however, can also power cycle a server to insert, remove, or replace hardware components. When additional components are added, a detailed reboot may be needed to setup, apportion resources to, and install added hardware components. For example, a user may open a chassis to insert non-hot-pluggable PCIe devices such as network interface controllers, non-volatile memory express components, and other non-hot-pluggable PCIe components that require a detailed boot of an information handling system following installation. An information handling system may be configured to assume that no hot-pluggable PCIe components are inserted except when booting of a non-volatile memory express component.

An information handling system may verify whether a chassis intrusion flag has been detected, and, if such a flag has been detected, may perform a detailed reboot. A method 700 for determining whether to perform a quick boot or detailed boot based on a chassis intrusion flag may begin, at step 702, with rebooting an information handling system. For example, an information handling system may be powered down, automatically or by a user instruction and may be started up. In another example, an information handling system, such as a server, may be received from a distributor and may be set up and booted following receipt. In another example, an information handling system may be power cycled to allow a user to install one or more hardware components.

After the information handling system has started, a determination may be made, at step 704, of whether a chassis of the information handling system has been opened following a prior boot. For example, a chassis intrusion flag may be examined to determine if the chassis has been opened. A chassis intrusion flag may be toggled when a chassis of the information handling system is opened. For example, a chassis of an information handling system may include one or more sensors connected to one or more batteries, such as complimentary metal-oxide semiconductor batteries, that may detect when a chassis is opened, even when an information handling system is powered down. A chassis intrusion may be required to add or remove information handling system components. When powered up, the information handling system may examine a chassis intrusion flag in a memory of the sensor to determine if the sensor indicates that a chassis intrusion has occurred. Alternatively, the sensor may update a chassis intrusion flag stored in a NVRAM of the information handling system to indicate that an intrusion has occurred.

If the chassis has been opened, the information handling system may perform a detailed boot, at step 708. The presence of the chassis intrusion flag indicates that new hardware may have been inserted following a prior boot. The addition of new hardware requires recalculation of a bus device map that may require a detailed boot instead of a quick boot. After performing the detailed boot, and, in some cases, storing a good map of boot devices, the information handling system may reset the chassis intrusion flag. An information handling system may perform method 500, but even if it is determined that a boot does not require an update to a firmware or hardware component, the information handling system may perform a detailed boot if a chassis intrusion flag is detected.

If a chassis has not been opened, the information handling system may perform a quick boot, at step 706. For example, if an information handling system has determined that there are no firmware or hardware updates to be installed with a boot and that a chassis intrusion has not been detected, the information handling system may perform a quick boot, bypassing a variety of BIOS processes, as discussed herein, and loading a last known good map of boot devices, as discussed herein.

The schematic flow chart diagrams of FIGS. 4-7 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for booting an information handling system, comprising:
   determining whether a chassis of the information handling system was opened following a prior boot;
   determining whether a boot of the information handling system does not require installation of an update, downloaded by the information handling system, to a firmware of the information handling system; and booting by bypassing one or more basic input/output system (BIOS) power-on self-test (POST) operations upon determining that the boot of the information handling system does not require installation of the update and that the chassis of the information handling system was not opened following the prior boot, wherein the booting by bypassing one or more BIOS POST operations comprises at least one of:

bypassing peripheral component interconnect (PCI) device discovery and PCI device enumeration;

restoring a PCI resource allocation from a non-volatile random access memory (NVRAM);

bypassing system inventory collection and transmission; or restoring system information from the NVRAM.

2. The method of claim 1, wherein determining that the boot does not require installation of an update, downloaded by the information handling system, to a firmware of the information handling system comprises determining that the boot requires only installation of an update to one or more software components of the information handling system.

3. The method of claim 2, wherein the update to the one or more software components of the information handling system comprises at least one of an update to a software application of the information handling system, an update to an operating system (OS) of the information handling system, or an update to a kernel of the information handling system.

4. The method of claim 1, wherein determining that the boot does not require installation of an update, downloaded by the information handling system, to a firmware of the information handling system comprises determining that a boot flag stored in a non-volatile random access memory (NVRAM) of the information handling system indicates that a detailed boot is not required.

5. The method of claim 1, further comprising performing a detailed boot, based on determining that the chassis of the information handling system was opened following a prior boot.

6. The method of claim 1, further comprising loading a last known good map of boot devices, during booting, from a non-volatile random access memory (NVRAM) of the information handling system.

7. An information handling system comprising:
a processor; and
a non-volatile random access memory (NVRAM),
wherein the processor is configured to perform steps comprising:
determining whether a chassis of the information handling system was opened following a prior boot;
determining whether a boot of the information handling system does not require installation of an update, downloaded by the information handling system, to a firmware of the information handling system; and
booting by bypassing one or more basic input/output system (BIOS) power-on self-test (POST) operations upon determining that the boot of the information handling system does not require installation of an update and that the chassis of the information handling system was not opened following the prior boot, wherein booting by bypassing one or more BIOS POST operations comprises at least one of:
bypassing peripheral component interconnect (PCI) device discovery and PCI device enumeration;
restoring a PCI resource allocation from a non-volatile random access memory (NVRAM);
bypassing system inventory collection and transmission; or
restoring system information from the NVRAM.

8. The information handling system of claim 7, wherein determining that the boot does not require installation of an update, downloaded by the information handling system, to a firmware of the information handling system comprises determining that the boot requires only installation of an update to one or more software components of the information handling system.

9. The information handling system of claim 8, wherein the update to the one or more software components of the information handling system comprises at least one of an update to a software application of the information handling system, an update to an operating system (OS) of the information handling system, or an update to a kernel of the information handling system.

10. The information handling system of claim 7, wherein determining that the boot does not require installation of an update, downloaded by the information handling system, to a firmware of the information handling system comprises determining that a boot flag stored in the non-volatile random access memory (NVRAM) of the information handling system indicates that a detailed boot is not required.

11. The information handling system of claim 10, further comprising performing a detailed boot, based on determining that the chassis of the information handling system was opened following a prior boot.

12. The information handling system of claim 7, wherein the processor is further configured to perform steps comprising loading a last known good map of boot devices, during booting, from the NVRAM of the information handling system.

13. A computer program product, comprising:
a non-transitory computer readable medium comprising instructions that, when executed by a processor, cause the processor to perform steps comprising:
determining whether a chassis of the information handling system was opened following a prior boot;
determining whether a boot of the information handling system does not require installation of an update, downloaded by the information handling system, to a firmware of the information handling system; and
booting by bypassing one or more basic input/output system (BIOS) power-on self-test (POST) operations upon determining that the boot of the information handling system does not require installation of an update and that the chassis of the information handling system was not opened following the prior boot, wherein booting by bypassing one or more BIOS POST operations comprises at least one of:
bypassing peripheral component interconnect (PCI) device discovery and PCI device enumeration;
restoring a PCI resource allocation from a non-volatile random access memory (NVRAM);
bypassing system inventory collection and transmission; or
restoring system information from the NVRAM.

14. The computer program product of claim 13, wherein determining that the boot does not require installation of an update, downloaded by the information handling system, to a firmware of the information handling system comprises determining that the boot requires only installation of an update to one or more software components of the information handling system.

15. The computer program product of claim 14, wherein the update to the one or more software components of the information handling system comprises at least one of an update to a software application of the information handling system, an update to an operating system (OS) of the information handling system, or an update to a kernel of the information handling system.

16. The computer program product of claim 13, wherein determining that the boot does not require installation of an update, downloaded by the information handling system, to a firmware of the information handling system comprises determining that a boot flag stored in a non-volatile random access memory (NVRAM) of the information handling system indicates that a detailed boot is not required.

17. The computer program product of claim 13, wherein the non-transitory computer readable medium comprises instructions that, when executed by the processor, cause the processor to perform steps further comprising loading a last known good map of boot devices, during booting from a non-volatile random access memory (NVRAM) of the information handling system.

* * * * *